May 14, 1957   E. L. COPENHAVER ET AL   2,791,974
APPARATUS FOR MOULDING DOUGH
Filed May 27, 1953   3 Sheets-Sheet 1
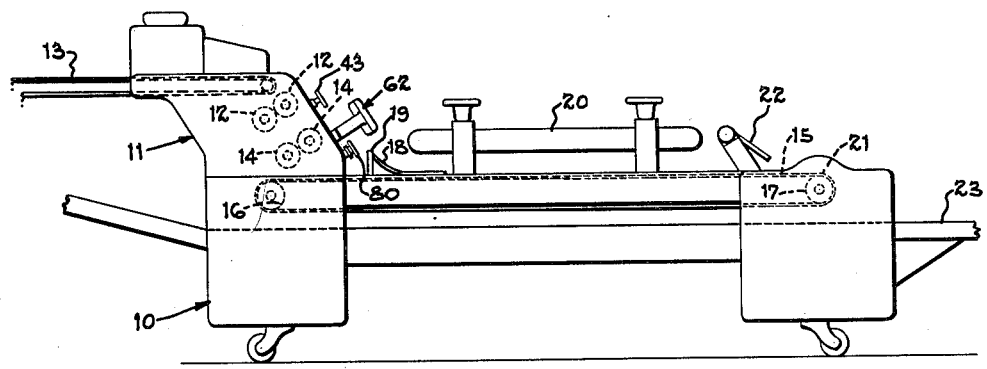
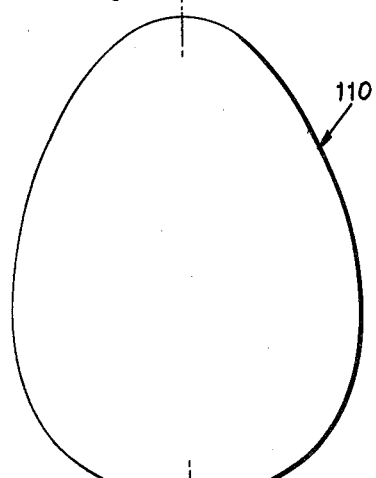
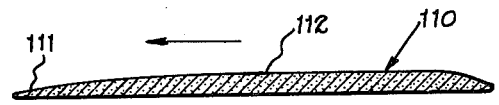
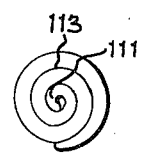
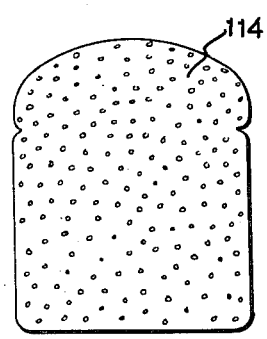
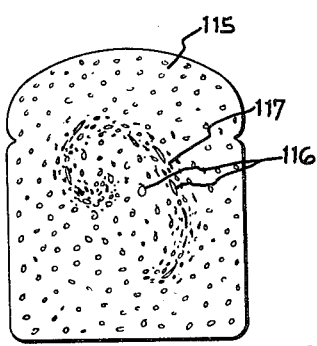
INVENTORS.
Elmer L. Copenhaver.
BY Fred Cantabery.
Wood, Herron & Evans.
ATTORNEYS.

INVENTORS.
Elmer L. Copenhaver.
BY Fred Cantaberg.
Wood, Herron & Evans.
ATTORNEYS.

2,791,974
APPARATUS FOR MOULDING DOUGH

Elmer L. Copenhaver, Charleston, and Fred Cantabery, Beckley, W. Va.

Application May 27, 1953, Serial No. 357,826

7 Claims. (Cl. 107—12)

This invention relates to bread baking, and is particularly directed to apparatus for moulding dough prior to baking.

In recent years extensive efforts have been made to improve the quality of bread baked on a commercial scale. Principally, it has been the aim of the baking industry to eliminate irregularities such as core formation in a bread loaf, and to produce a loaf having small uniform cells and an even texture, free from localized areas of hardening.

It has been common practice in commercial bakeries for a substantial number of years to remove dough lumps from an intermediate proofer in which they have been deposited, subsequent to dividing and rounding, and to pass them through a series of pairs of sheeting rolls, by means of which the dough is compressed to eliminate large gas pockets and is elongated into sheet form. After the dough has thus been sheeted, it is passed beneath a freely depending chain, or similar element, and is curled into a scroll, in which form it is deposited in a baking pan prior to final proofing and baking.

While this method of baking bread has proved generally satisfactory, the loaves produced are subject to certain well recognized imperfections which may have an adverse effect upon the consumer's acceptance of the loaf. The principal defect encountered is the formation of "core." That is, the center of the loaf has a non-homogeneous cell structure, and often has several large void spaces. Moreover, there is present a dry, dense streak of dough, corresponding generally to the innermost convolution of the curled sheet. These defects adversely effect not only the appearance of the loaf, but its eating qualities as well.

Two general dough treating methods have been proposed for eliminating "core" from loaves of bread. The first of these methods is known as cross grain moulding, or more accurately cross grain curling. The theory of cross grain curling is that if the dough is sheeted into a relatively thick sheet, and is then rotated ninety degrees between the sheeting operation and the curling operation, the large cells and voids are more effectively broken up, and the cell structure is made more uniform without overworking the dough in one direction or subjecting it to severe punishment. In practice, however, it has been found that the major effect of cross grain curling is merely to transfer the "core" or non-uniform slices of bread from the center portion of the loaf to an endwise portion of the loaf. In other words, the third or fourth slice from the end of a loaf made by cross curling will exhibit substantially the same "core" defects as the center slices of a conventionally moulded loaf.

A second solution which has been proposed for the elimination of core is known as reverse sheeting. In reverse sheeting the dough is compressed between one set of sheeting rollers in the usual manner; but before curling, the dough is inverted end for end and is passed through additional sets of rollers which compress it in a direction completely reversed from the direction in which it was originally sheeted. The reverse sheeting process recognizes that one of the causes of core is that the tip, or leading edge of the dough, is relatively dry, and consequently does not contain enough moisture to develop a soft grain structure similar to that of the surrounding portions of the loaf. However, for various reasons which need not be discussed here, the reverse sheeting process does not completely correct this difficulty, and bread baked by the reverse sheeting method does not possess a uniform cellular structure, nor is it free from the dense whorls of bread moulded in a conventional manner.

The principal object of the present invention is to provide apparatus for producing a loaf of bread having a substantially uniform cell structure throughout its entire length; in other words, a loaf free from "core" adjacent its ends as well as in its central portion. The present invention is predicated upon the discovery that core is due primarily to the fact that as the loaf advances through the final sheeting rolls, the forward, or leading edge of the dough, is thinner than the remaining portions of the sheet and passes through the rolls without being compressed. Consequently, the area of the dough adjacent to the forward edge contains substantial quantities of gas which result in large voids and uneven cell structure when the loaf is baked.

To overcome this difficulty, the present invention contemplates a moulder having two sets of rollers, the first pair of rollers are of conventional construction and function as flattening rollers; that is, they receive the dough in lump form and function to slightly flatten and elongate it, while simultaneously forcing a portion of the gas entrapped within the lump out through the rear edge of the lump.

A second set of rollers is provided for receiving the dough after it is passed through the flattening rolls. These latter rollers I shall term "sheeting" rolls, and it is their function to compress the dough into a thin sheet in order to remove all of the excess gas, stretch the gluten and break up the pores to provide a lump of uniform porosity. One of the sheeting rolls is movable toward and away from the other sheeting roll, and is resiliently urged toward the roll. The rolls are set apart a minimum distance, at which they are effective to compress the thin tip portion of the dough as well as the thicker central portion. Then as the central portion of the dough sheet passes between the sheeting rolls, they are forced apart slightly, so that they do not unduly punish the central portion of the sheet.

The advantage of this construction is that the entire sheet of dough is subjected to a substantially uniform compressive action and excess gas is removed from the tip, as well as from the central portion of the sheet. This is in sharp contrast with the action of conventional, rigidly mounted rolls in which not only does the gas remain in the tip portion, but in fact additional gas is forced into that portion by the compressive action of the rolls on the central area of the sheet.

Another object of the present invention is to eliminate the hardened whorls from a loaf of bread. This object depends for its attainment upon the recognition of the fact that the tip, or leading edge of the dough, is relatively dry. However it is the concept of the present invention to condition the dough so that this dryness is corrected during the proofing and baking process, rather than attempting to forcibly rearrange the moisture in the sheet. The shortcomings of reverse sheeting demonstrate that the moisture cannot be forcibly distributed in a uniform manner, and furthermore any attempt to do so results in undue punishment of the dough with consequent detrimental effects on bread quality.

It is an important concept of the present invention to roll the tip of the dough much thinner than the remaining portion of the dough so that the dry tip is in contact with a maximum area of the normally moistened portions of the dough and transfer of moisture is thus facilitated from the central convolutions of the dough scroll inwardly toward the dry innermost convolutions.

The method aspect inherent in the apparatus of the present invention involves two novel concepts in the preparation of dough for baking. In the first place the dough is flattened into sheet form, and the sheet is then compressed so that its entire area is subjected to the same compressive pressure. Hence all of the excess gas is removed from the sheet, and yet no portion of the sheet is subjected to undue punishment. In the second place the tip, or leading edge of the dough, is rolled much thinner than the remainder of the sheet in order to increase its surface area and thus facilitate transfer of moisture to the tip during final proofing and baking.

One of the advantages of the apparatus of the present invention is that the moulder may be used with dough lumps of one weight and subsequently used in conjunction with dough lumps of a different weight without requiring any adjustment in the spacing of the resiliently mounted sheeting roll. This greatly facilitates moulder operation in bakeries in which successive runs are made on loaves of different sizes.

A still further advantage of this invention, one for which no feasible explanation can be advanced, is that the dough sheets can be compressed thinner, without tearing than is possible with rigidly mounted rolls. In other words, this invention gives rise to the seemingly paradoxical result that dough can be compressed thinner by yieldable rolls than it can be by non-yieldable rolls. This extremely thin sheeting not only effectively removes all of the excess gas and breaks down all of the pores to very small size, but it is accomplished without any appreciable abuse of the dough, so that an extremely fine, even texture is obtained without any of the defects normally present in thinly sheeted dough.

These and other advantages of the present invention will be apparent from a consideration of the following detailed description of the drawings illustrating a preferred embodiment of a moulder constructed in accordance with this invention.

In the drawings:

Figure 1 is a side view of a moulder provided with resiliently supported rollers.

Figure 6 is a top plan view of a sheet of dough moulded in accordance with the present invention.

Figure 7 is a cross sectional view taken along line 7—7 of Figure 6.

Figure 8 is an elevational view of a slice of bread taken from a loaf made in accordance with this invention.

Figure 9 is a view of a center slice of bread from a conventionally moulded loaf; although a slice from the end of a cross curled load would appear substantially the same.

Figure 10 is a side view of a curled sheet of dough in the form in which it is deposited in a baking pan.

Figure 2:
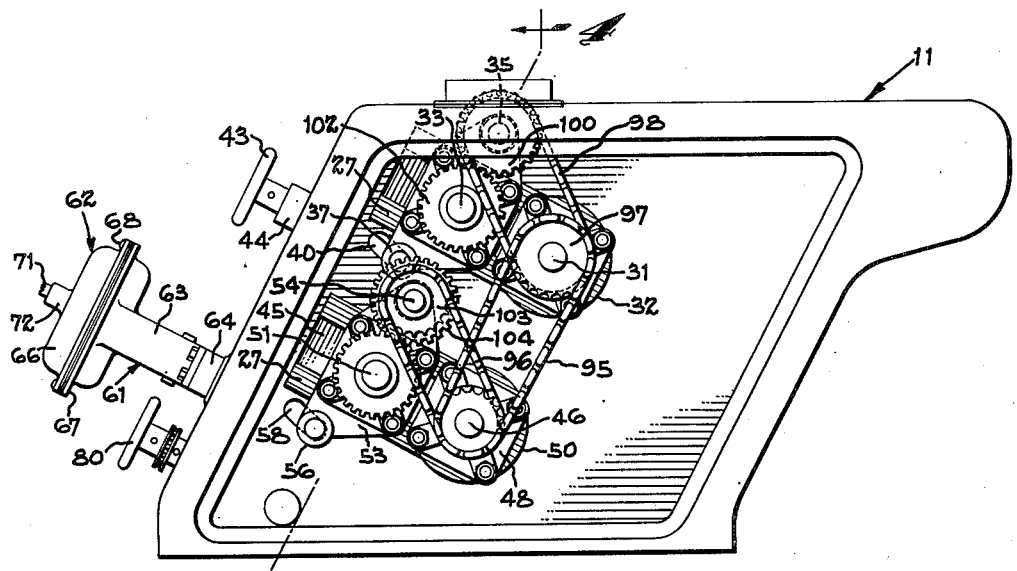
Figure 2 is a side elevational view of one side of the moulder head with the cover removed to show the chain drive.

As shown in Figure 1, a moulder 10 constructed in accordance with the present invention comprises a head 11, including a pair of flattening rolls 12 which receive a succession of dough lumps as they are discharged from a feed conveyor 13 and a pair of sheeting rolls 14 disposed beneath the flattening rolls for engagement with the lumps as they are discharged from the flattening rolls. An endless conveyor belt 15 passes over rollers 16 and 17 adjacent the two ends of the moulder. The belt extends beneath the sheeting rolls, where it receives sheets of dough as they are discharged from those rolls, and then passes beneath a curling chain 18 which is secured to supports 19 and rides upon the conveyor belt.

A conventional pressure board, shown somewhat diagrammatically at 20, is provided intermediate the chain and the discharge end 21 of the conveyor. A dough engaging flap 22 is preferably provided for actuating a panning device for controlling the movement of pans along conveyor 23 so that one or more lumps of dough are deposited into each pan.

The novelty of the present invention resides in the sheeting rolls 14 located in head 11 of the moulder, and it will be understood that the other elements of the moulder, such as the curling chain, pressure board, and panner can be of any suitable type known in the art. Furthermore, as I shall explain below, the sheeting roller arrangement of this invention can be employed with a cross grain moulder as well as with a straightaway moulder of the type shown.

The moulder head and sheeting roll construction of the present invention can best be understood from a consideration of Figures 2–5.

As there shown, the moulder head 11 includes side frame members 25 which are mounted on one end of the main moulder bed. Each of the side frame members is provided with two parallel shaft receiving slots 26—26; adjacent to each of these slots the frame members are preferably configurated to form raised bearing pads 27 which extend parallel to the slots on opposite sides thereof. The bearing pads serve as bearing surfaces for the journal blocks of the flattening and sheeting rollers.

Figure 5:
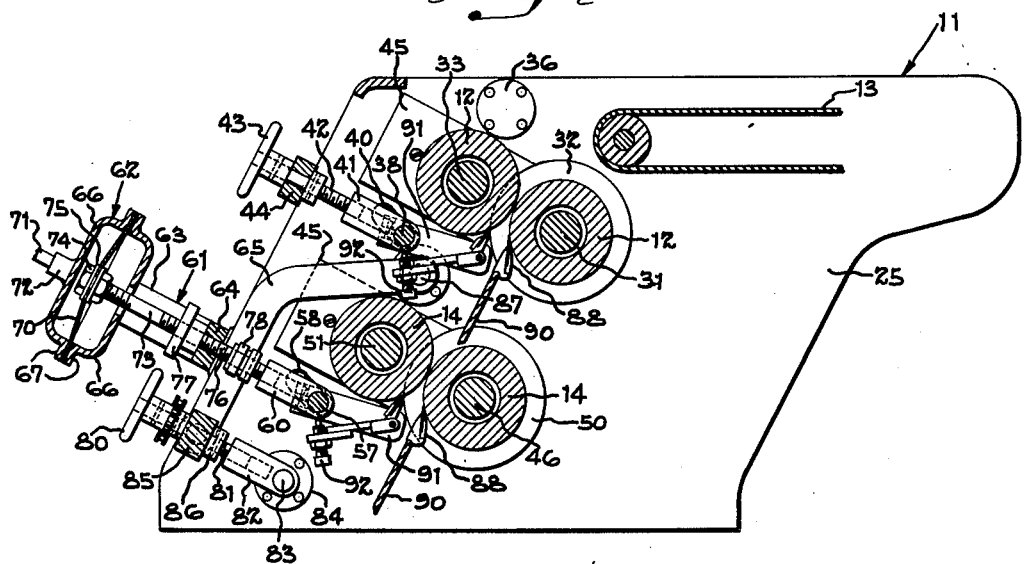
Figure 5 is a cross sectional view taken along line 5—5 of Figure 4.

The journal blocks 28 supporting the rear flattening roll are bolted to the bearing pads by means of bolts 30. Each of the journal blocks 28 includes a suitable bushing or ball bearing assembly for journaling shaft 31. Shaft 31 carries rear flattening roll 12 and two end flanges 32 which abut the ends of the rear flattening roll and engage the ends of the forward flattening roll, as indicated in Figure 5.

The forward flattening roll is carried by shaft 33, the ends of which are journalled in mounting brackets 34, the mounting brackets in turn being pivotally supported by rocker shafts 35. Each rocker shaft is supported in any suitable manner, for example by means of boss fittings 36 which are bolted to the side frame members. The mounting brackets 34 bear against bearing pads 27 and each includes a boss 37 provided with a bore for receiving cross rod 38. The cross rod passes through an arcuate slot 40 in each of the side frame member 25, and carries a positioning cup 41 which is provided with a threaded opening adapted for engagement with adjustment screw 42.

The end of the adjustment screw remote from cup 41 is secured to handle 43, in any suitable manner, such as by a pin. The handle includes a collar in abutment with a cross bar 44, extending between the two side frame members 25; a separate collar is pinned to the adjustment screw in abutment with the opposite side of the cross bar. By turning handle 43, the adjustment screw is threaded in or out of cup 41 to move cross rod 38 along the arcuate slot and simultaneously pivot mounting brackets 34 about pivot pins 35, thereby altering the spacing between the flattening rolls. A cover plate 45 is provided over the shaft 33 inside each of the side walls to prevent any excess dough from passing through the slots 26 and interfering with the roller drive mechanism.

The rear sheeting roll is mounted in identically the same way as the rear flattening roll; that is, the rear sheeting roll is mounted upon shaft 46, the ends of which are journalled in journal brackets 47 and 48, these in turn being bolted to the bearing pads on the side frame members. The rear sheeting roll also is provided with two end flanges 50 in abutment with the ends of the rear sheeting rolls and adapted to engage the ends of the forward sheeting roll.

The forward sheeting roll, unlike the flattening rolls or the rear sheeting roll is not firmly mounted, but is resiliently mounted for movement toward and away from the rear sheeting roll. Specifically, the forward sheeting roll is mounted upon shaft 51, the ends of the shaft being journalled in suitable bearings carried by mounting brackets 52 and 53. The mounting brackets are pivotally supported from pivot pins 54 carried by suitable boss fittings 55 bolted, or otherwise secured to the side frame members. The mounting brackets 52 bear against the bearing pads provided on the side frame members and include bosses 56, carrying rod 57. The rod 57 passes through arcuate slots 58 in the side frame members and engages positioning cup 60 of the resilient supporting means 61.

The resilient supporting means comprises, in addition to the positioning cup 60, a pneumatic bell 62 provided with legs 63 by means of which the bell is secured to cross bar 64. The ends of the cross bar 64 are secured to two swing arms 65, although as will be explained later, it is contemplated that the ends of the cross bar may be secured directly to the side frame members.

Bell 62 is constituted by two complemental dished out housing members 66; each member being provided with a peripheral flange 67. The two flanges are secured together by bolts 68 with a flexible diaphragm member 70 disposed between them. The flexible diaphragm may be made of any suitable diaphragm material, and together with flanges 67 forms an air tight seal at the juncture of the two halves of the bell. The upper housing member and diaphragm thus comprise a sealed compression chamber which communicates with an air inlet line 71, the inlet line being connected to the housing by means of a suitable fitting 72.

It will be understood that air inlet line 71 is part of a conventional air pressure system including a compressor, a gauge, and regulating means, preferably in the form of a bleeder valve for maintaining a constant predetermined pressure in the line. Since these elements are conventional, and constitute no part of the invention, they are not shown and will not be described in detail.

In the preferred embodiment, the diaphragm is provided with a central opening through which is passed one end of actuating rod 73. The rod is clamped to the diaphragm by means of bolts 74 which are threaded over the end of the rod and are effective to compress the diaphragm between suitable washers 75. The actuating rod 73 also includes a threaded portion 76 adjacent to its other end, the threaded portion residing in engagement with positioning cup 60. Actuating rod 73 also carries two run down nuts 77 and 78 adapted for engagement with cross bar 64 to limit the movements of the forward sheeting roll, as will be explained below.

Adjustment of the spacing between the forward and rearward sheeting rolls can be effectuated by turning either of the handles 80. The handles are interconnected by a chain so that rotation of one causes a like rotation of the other. Each of the handles is attached to one end of an adjustment screw 81, the other end of the screw engaging a pivoted member 82 mounted upon pin 83. Pins 83 are carried by brackets 84 secured to the side frame members. Handles 80 reside in engagement with cross piece 85, the ends of which are secured to swing arms 65. Collars 86 are secured to the adjusting screws on the underside of cross piece 85 to hold the handles in place. By turning either handle 80, adjustment screws 81 are threaded in or out of members 82, and the ends of swing arms 65 are thus pivoted about pins 87. Pivotal movement of the swing arms causes a like movement of bell 62, which in turn moves the forward sheeting roll through actuating rod 73, cross rod 57, and mounting brackets 52.

One suitable form of roll scraper is shown in Figure 5 of the drawings. However, it will be understood that the scrapers constitute no part of the present invention, and any suitable form of scraper may be employed. As shown, the scrapers include blades 88 in engagement with the sheeting and flattening rolls and flaps 90 extending beneath the rolls and forming dough guiding surfaces. The scraper assembly also includes mounting brackets 91 which fit over cross rods 38 and 57 and set screws 92 for adjustably positioning the scrapers.

Figure 3:
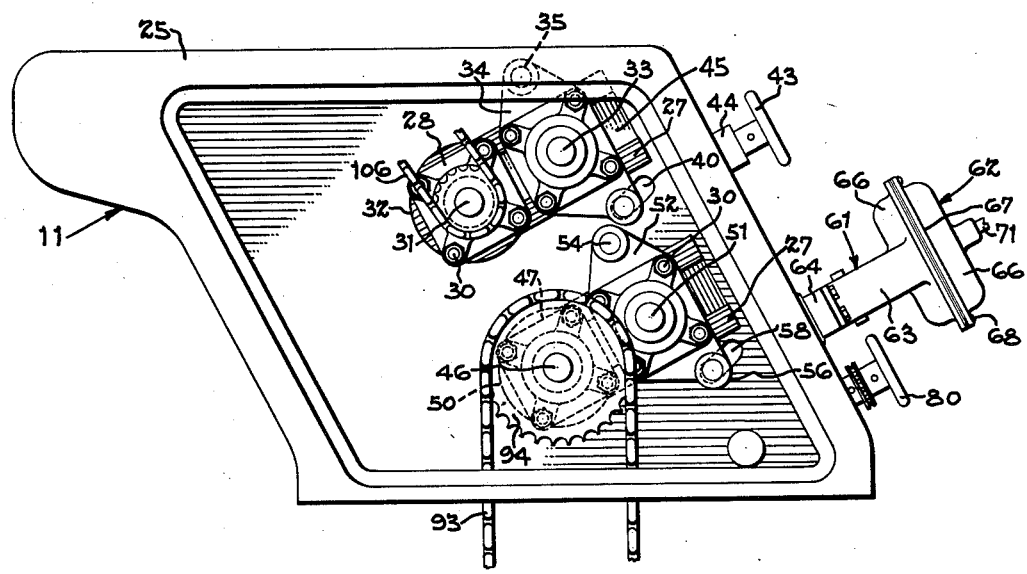
Figure 3 is a view similar to Figure 2 of the opposite side of the moulder head.
Figure 4:
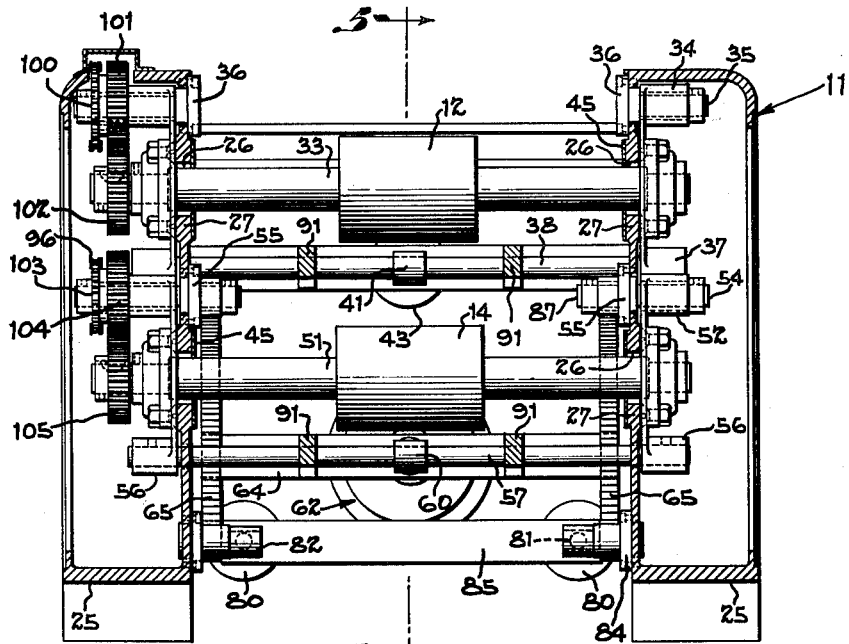
Figure 4 is a cross sectional view taken along line 4—4 of Figure 2.

One suitable form of roller drive is illustrated in Figures 3 and 4. As there shown, a main drive chain 93 which is interconnected with a suitable electric motor (not shown) engages a sprocket 94 mounted upon shaft 46, carrying the rear sheeting roll. The drive is carried by shaft 46 to the opposite side of the moulder head where it is taken off through chains 95 and 96 mounted on sprockets carried by shaft 46.

Chain 95 passes over sprocket 97 mounted on shaft 31 causing the rotation of the rear flattening roll. A second sprocket is mounted on shaft 31, and drives chain 98 which in turn engages idler sprocket 100 mounted on rocker shaft 35. The idler sprocket is interconnected with pinion 101 which meshes with gear 102 carried by shaft 33. Gear 102 remains in mesh with pinion 101 as journal block 27 is pivotally adjusted about rocker shaft 35, and in this manner the forward flattening roll is driven.

The drive for the forward sheeting roll is taken from chain 96 which passes over idler pulley 103, the idler pulley being carried by pivot pin 54 and being mechanically interconnected with pinion 104. The pinion in turn drives gear 105 which is keyed to shaft 51 carrying the forward sheeting roll. Thus, the forward sheeting roll is driven in synchronism with the remaining rolls. In addition, it is preferable that the feed conveyor be driven at a speed correlated with the roller speed. The drive for this conveyor is preferably taken from the rear sheeting roll shaft through chain 106.

In order to set up the moulder for use, several adjustments are made. In the first place, the minimum roller spacing is established between the sheeting rolls. In the embodiment shown, this is accomplished by turning handles 80 to pivot swing arms 65 in or out, causing the forward sheeting roll to move in an arcuate path toward or away from the other sheeting roll as described above with the swing arms positioned, the inward travel of the forward sheeting roll is limited by the engagement of nut 77 with cross bar 64. The maximum opening between the sheeting rolls is controlled by the setting of nut 78 which is disposed for abutment with the undersurface of the cross bar 64 when the forward sheeting roll moves away from the rearward sheeting rod. The maximum and minimum settings of the sheeting rolls can be made to suit the requirements of each individual bakery. However, it has been found that good results are obtained by employing a minimum roller spacing of .001 inch.

A second adjustment is that of the air pressure acting within the compression chamber. The exact pressure effective to produce the best results will of course vary with such conditions as the formula employed in compounding the dough, the proofing time allowed, the temperature and humidity conditions and the like. I have found that good results are obtained when employing a diaphragm seven inches in diameter if the air pressure is maintained at a half a pound per square inch.

While a pneumatic bell has been disclosed as the preferred means for resiliently urging the sheeting rolls together, it is contemplated that other means such as a hydraulic system or a spring arrangement could also be used. The particular advantages of a pneumatic compression arrangement are that it resists further displacement of the sheeting roll with a constant pressure, no matter how far the roll is already displaced. This is not generally true of spring mountings which tend to resist further movement with a force proportional to the amount the spring is displaced; it is appreciated however that spring arrangements can be devised in which this variable pressure condition does not prevail. Furthermore, the provision of a pneumatic system facilitates adjustment of the pressure on the sheeting roll, since it requires only a simple adjustment of a conventional pressure regulator, as compared to the rather cumbersome manipulations necessary to accurately adjust the tension on a spring or similar device.

When the moulder is in operation, dough lumps are deposited from the intermediate proofer onto feed conveyor 13. From the feed conveyor, the lumps pass between the flattening rolls 12 which are effective to partially flatten them and force a portion of the excess gas through the rear end of the sheet. After the sheets emerge from the flattening rolls, they drop to the sheeting rolls. As the sheets enter the sheeting rolls, the leading edge or tip of the sheet is thinner than the remaining portions. However, the sheeting rolls are set at a minimum spacing which is less than the thickness of the leading edge of the dough, and consequently this portion of the sheet is engaged between the sheeting rolls. As the remainder of the sheet passes through the rolls, the forward sheeting roll yields under the pressure of the dough and moves away from the rear sheeting roll against the pressure of the air entrapped within the compression chamber of pneumatic bell 62.

As the dough sheet progresses through the sheeting rolls, each area of the sheet is subjected to substantially the same pressure, and all of the excess gas is removed from the sheet in an effective manner. Also the tip or leading edge of the tip is compressed thinner by the sheeting rolls than the remaining portions of the sheet. This is shown in Figures 6 and 7; Figure 6 shows a sheet of dough 110 as it emerges from the sheeting rolls, the arrow indicating the direction of dough travel. Figure 7 is a cross sectional view of the sheet, and shows how the tip portion 111 is rolled thinner than the central portion 112.

After sheeting, the dough is deposited upon conveyor 15 and is carried beneath curling chain 18, by means of which it is curled into a scroll, the thin dry tip portion 111 forming the innermost convolution. However, because the tip has been rolled very thin, its surface area has been greatly increased, thereby facilitating the transfer of moisture from the central convolutions 113 of the scroll inwardly toward the tip.

After a loaf of bread moulded in accordance with this invention has been baked, a slice 114 will look substantially like that shown in Figure 8 and will be characterized by its even texture, freedom from localized areas of hardending, and freedom from large voids.

Figure 9 shows a slice of bread 115 taken from a loaf moulded in accordance with previously existing methods, and illustrates the defects which it is the object of the present invention to avoid. As there shown, the grain structure is not homogeneous and there are large voids 116. Furthermore, there is a streak of dense dry bread 117 generally corresponding to the innermost convolution of the scrolled dough.

It will be understood that various modifications can be made without departing from the scope of this invention. For example, the resiliently urged sheeting rolls of this invention can be employed in conjunction with cross grain moulders as well as moulders of the straight-away type and will provide advantageous results with either, since the relatively uniform pressure applied to the entire surface of the dough sheet will result in an even finished texture free from voids, without any of the defects normally caused by subjecting dough to high sheeting pressures.

Should it be desired to operate a moulder embodying the rolls of this invention in a conventional manner, that is with the axis of rotation of both sheeting rolls fixed, only a simple adjustment is required. In the embodiment shown, handles 80 and stop nut 77 are turned to space the forward sheeting roll the desired distance from the rear sheeting roll. Stop nut 77 is thus effective to prevent the rolls from moving closer together. Then, stop nut 78 is run up tightly against cross bar 64 and is effective to prevent the forward sheeting roll 14 from moving away from the rearward sheeting roll. Hence, the two rolls are locked in position relative to one another, and the moulder can be operated in a conventional manner if desired.

Having described our invention we claim:

1. In a dough moulder, the combination of a pair of sheeting rolls, one of said sheeting rolls being mounted for rotation on a fixed axis an axis fixed relative to said moulder, the second of said sheeting rolls being disposed adjacent to said first sheeting roll, and being mounted for rotation about an axis movable toward and away from said first sheeting roll, means for resiliently urging said second sheeting roll toward said first sheeting roll, said means comprising a compression chamber, means for maintaining the air pressure within said chamber at a predetermined value, a flexible diaphragm exposed to the pressure within said chamber, and members interconnecting said flexible diaphragm and said second sheeting roll whereby movement of said second sheeting roll is effective to move said diaphragm against the pressure in said compression chamber.

2. In a dough moulder the combination of a pair of sheeting rolls one of said sheeting rolls being mounted for rotation on an axis fixed relative to said moulder, the second of said sheeting rolls being disposed adjacent to said first sheeting roll, and being mounted for rotation about an axis movable toward and away from said first sheeting roll, means for resiliently urging said second sheeting roll toward said first sheeting roll, said means comprising a compression chamber, means for maintaining the air pressure within said chamber at a predetermined value, a flexible diaphragm exposed to the pressure within said chamber, members interconnecting said flexible diaphragm and said second sheeting roll whereby movement of said second sheeting roll is effective to move said diaphragm against the pressure in said compression chamber, and means for limiting the movement of said second roll toward said first roll to establish a minimum roll spacing.

3. In a dough moulder the combination of a pair of sheeting rolls one of said sheeting rolls being mounted for rotation about an axis fixed relative to said moulder, the second of said sheeting rolls being disposed adjacent to said first sheeting roll, and being mounted for movement toward and away from said roll, means for urging said second sheeting roll toward said first sheeting roll, said means comprising a compression chamber, means for maintaining the air pressure within said chamber at a predetermined value, a flexible diaphragm exposed to the pressure within said chamber, and members interconnecting said flexible diaphragm and said second sheeting roll whereby movement of said second sheeting roll is effective to move said diaphragm against the pressure in said compression chamber, and means for limiting the movement of said second roll toward and away from said first roll, said limiting means also being selectively effective to prevent any movement of the second roll toward and away from said first roll.

4. In a dough moulder side frame members the combination of first and second sheeting rolls a shaft carrying said first sheeting roll, said shaft being journalled in blocks fixedly positioned relative to said side frame members, a second shaft carrying the second sheeting roll, said second sheeting roll being disposed adjacent to said first sheeting roll, brackets for journalling said second shaft, said brackets being pivotally carried by said side frame members, means for urging said brackets to pivot causing the second sheeting roll to move toward said first sheeting roll, said means comprising a compression chamber, an air supply system for maintaining the air pressure within said chamber at a predetermined value, a flexible diaphragm forming one wall of said chamber, an actuating rod interconnected with said diaphragm, a cross rod interconnected with said actuating rod and said brackets.

5. In a dough moulder side frame members the combination of first and second sheeting rolls a shaft carrying said first sheeting roll, said shaft being journalled in blocks fixedly positioned relative to said side frame members, a second shaft carrying the second sheeting roll, said second sheeting roll being disposed adjacent to said first sheeting roll, brackets for journalling said second shaft, said brackets being pivotally carried by said side frame members, means for urging said brackets to pivot causing the second sheeting roll to move toward said first sheeting roll, said means comprising a compression chamber, an air supply system for maintaining the air pressure within said chamber at a predetermined value, a flexible diaphragm forming one wall of said chamber, an actuating rod interconnected with said diaphragm, a cross rod interconnected with said actuating rod and said brackets, and means for adjusting the spacing of said sheeting rolls, said means comprising a pair of swing arms pivotally secured to said side frame members, a cross bar secured to said swing arms, said compression chamber being mounted upon said swing arms, and means for adjustably positioning said swing arms.

6. In a dough moulder side frame members the combination of first and second sheeting rolls a shaft carrying said first sheeting roll, said shaft being journalled in blocks fixedly positioned relative to said side frame members, a second shaft carrying the second sheeting roll, said second sheeting roll being disposed adjacent to said first sheeting roll, brackets for journalling said second shaft, said brackets being pivotally carried by said side frame members, means for urging said brackets to pivot causing the second sheeting roll to move toward said first sheeting roll, said means comprising a compression chamber, an air supply system for maintaining the air pressure within said chamber at a predetermined value, a flexible diaphragm forming one wall of said chamber, an actuating rod interconnected with said diaphragm, a cross rod interconnected with said actuating rod and said brackets, and means associated with said actuating rod for limiting the movement of said second roll away from said first roll.

7. In a dough moulder side frame members the combination of first and second sheeting rolls a shaft carrying said first sheeting roll, said shaft being journalled in blocks fixedly poitioned relative to said side frame members, a second shaft carrying the second sheeting roll, said second sheeting roll being disposed adjacent to said first sheeting roll, brackets for journalling said second shaft, said brackets being pivotally carried by said side frame members, means for urging said brackets to pivot causing the second sheeting roll to move toward said first sheeting roll, said means comprising a compression chamber, an air supply system for maintaining the air pressure within said chamber at a predetermined value, a flexible diaphragm forming one wall of said chamber, and actuating rod interconnected with said diaphragm, a cross rod interconnected with said actuating rod and said brackets, means for adjusting the spacing of said sheeting rolls, said means comprising a pair of swing arms pivotally secured to said side frame members, a cross bar secured to said swing arms, said compression chamber being mounted upon said swing arms, and means for adjustably positioning said swing arms, and means for limiting the movement of said second sheeting roll toward said first sheeting roll, said means comprising a member associated with said actuating rod and disposed for engagement with said cross bar.

References Cited in the file of this patent

UNITED STATES PATENTS

| | | |
|---|---|---|
| 551,714 | Bromley | Dec. 17, 1895 |
| 598,982 | Egger | Feb. 15, 1898 |
| 661,999 | Kessler | Nov. 20, 1900 |
| 756,259 | Malone et al. | Apr. 5, 1904 |
| 818,196 | Rockwell et al. | Apr. 17, 1906 |
| 1,643,408 | Fornaca | Sept. 27, 1927 |
| 1,801,286 | Parsons | Apr. 21, 1931 |
| 2,246,949 | Parsons | June 24, 1941 |
| 2,425,356 | Sticelber | Aug. 12, 1947 |
| 2,655,118 | Whitehead et al. | Oct. 13, 1953 |
| 2,737,130 | Rhodes | Mar. 6, 1956 |